United States Patent [19]

Haddleton et al.

[11] Patent Number: 5,602,220
[45] Date of Patent: Feb. 11, 1997

[54] FREE RADICAL POLYMERISATION PROCESS

[75] Inventors: David M. Haddleton, Warwickshire; Andrew V. G. Muir, London, both of United Kingdom

[73] Assignee: Zeneca Limited, London, England

[21] Appl. No.: 596,230

[22] PCT Filed: Aug. 2, 1994

[86] PCT No.: PCT/GB94/01693

§ 371 Date: Feb. 9, 1996

§ 102(e) Date: Feb. 9, 1996

[87] PCT Pub. No.: WO95/04759

PCT Pub. Date: Feb. 16, 1995

[30] Foreign Application Priority Data

Aug. 9, 1993 [GB] Great Britain .................. 9316525

[51] Int. Cl.⁶ ..................... C08F 4/26; C08F 20/10; C08F 12/08; C08F 4/04
[52] U.S. Cl. .................. 526/172; 526/328; 526/328.5; 526/346; 526/347; 526/219.6
[58] Field of Search ................... 526/135, 172, 526/219.6, 328, 328.5, 346, 347

[56] References Cited

U.S. PATENT DOCUMENTS

| | | | |
|---|---|---|---|
| 4,169,092 | 9/1979 | Bayer | 526/172 |
| 4,526,945 | 7/1985 | Carlson et al. | 526/145 |
| 4,680,352 | 7/1987 | Janowicz | 526/147 |
| 4,680,354 | 7/1987 | Lin et al. | 526/172 |
| 4,722,984 | 2/1988 | Janowicz | 526/123 |
| 4,746,713 | 5/1988 | Janowicz | 526/170 |
| 4,886,861 | 12/1989 | Janowicz | 526/145 |
| 5,010,140 | 4/1991 | Antonelli | 525/269 |
| 5,028,677 | 7/1991 | Janowicz | 526/329.7 |

FOREIGN PATENT DOCUMENTS

| | | |
|---|---|---|
| 196783 | 10/1986 | European Pat. Off. |
| 199436 | 10/1986 | European Pat. Off. |
| 87/03605 | 6/1987 | WIPO |

OTHER PUBLICATIONS

Enikolopyan, N. S. et al, Catalyzed Chain Transfer to Monomer in Free Radical Polymerization, J. Polym Sc. Polymer Chem Ed., vol. 19, 879–889 (1981).

Primary Examiner—Joseph L. Schofer
Assistant Examiner—Wu C. Cheng
Attorney, Agent, or Firm—Cushman Darby & Cushman IP Group Pillsbury Madison & Sutro LLP

[57] ABSTRACT

Process for the free-radical polymerisation of olefinically unsaturated monomer(s) using a free-radical initiator, wherein said polymerisation is performed in the presence of a compound for effecting molecular weight control, said molecular weight control compound being selected from Cobalt II chelates of the following formulae I, II and III:

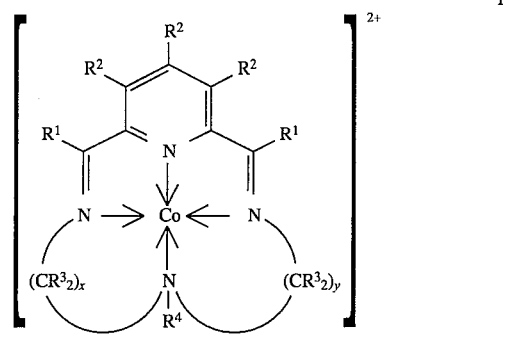

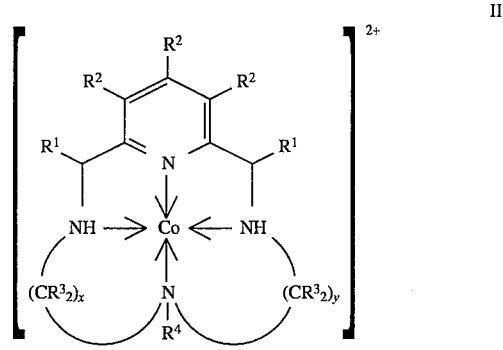

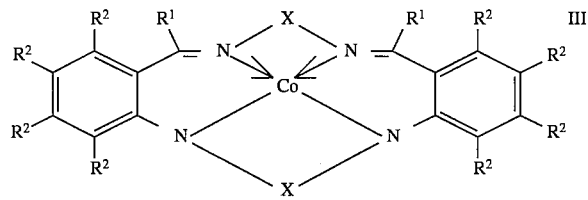

wherein:

x and y are independently 2 to 5;

each $R^1$, $R^2$, $R^3$ and $R^4$ is independently selected from H, C1–C12 alkyl, optionally substituted aryl, $OR^5$ where $R^5$ is C1 to C12 alkyl or optionally substituted aryl, $CO_2R^5$, $SO_3H$, $C(=O)R^5$, $CO_2H$, $NO_2$, OH, $NR^5_2$, $NH_2$, $NHR^5$, $SR^5$, SH, CN, $SO_3R^5$, halogen, 2-furyl and 3-furyl;

each X is independently selected from $(CR^6_2)_n$, $(CR^6_2O)_n$, optionally substituted o-phenylene, and optionally substituted 1,8-naphthylene, where each $R^6$ is independently selected from H and C1 to C12 alkyl, and n is 1 to 10;

and wherein said cobalt chelates of formulae I and II possess a positive charge of 2 and are associated with an anion or anions for balancing the positive charge, while that of formula III is neutral;

and also Co III analogues of said cobalt II chelates of formulae I, II and III in which the Co atom is additionally covalently bonded, in a direction at right angles to the macrocyclic chelate ring system, to H, a halide ion or other anion, or a homolytically dissociatable organic group.

14 Claims, No Drawings

FREE RADICAL POLYMERISATION PROCESS

This application claims benefit of international application PCT/ GB94/01693, filed Aug. 2, 1994.

The present invention relates to a process for the free-radical initiated polymerisation of olefinically unsaturated monomer(s) in which molecular weight control is achieved by the presence of certain cobalt chelate complexes.

Polymers of low molecular weight, known as oligomers, are often desired for various applications (such as coating compositions) either in their own right or as precursors for other polymers. In order to form oligomers it is necessary to appropriately control the polymerisation process being used to yield the desired type of product. In free-radical polymerisations, which are widely used for polymerising olefinically unsaturated monomers, various conventional means are employed for controlling and limiting the molecular weight of the growing polymer chains. Of these, the addition of thiol compounds to the polymerisation has probably been used the most extensively; the thiol acts as an effective chain transfer agent but unfortunately contaminates the system to which it has been added by virtue of its distinctive and persistent odour.

More recently, attention has turned to the use of various transition metal complexes, particularly cobalt chelate complexes, as chain transfer agents for use in controlling molecular weight when radically polymerising olefinically unsaturated monomers.

For example, various literature references, such as N. S. Enikolopyan et al, J. Polym. Sci., Polym. Chem. Ed., Vol 19, 879 (1981), disclose the use of cobalt II porphyrin complexes as chain transfer agents in free radical polymerisation, while U.S. Pat. No. 4,526,945 discloses the use of dioxime complexes of cobalt II for such a purpose. Various other publications, e.g. U.S. Pat. No. 4,680,354, EP-A-0196783, and EP-A-0199436, describe the use of certain other types of cobalt II chelates as chain transfer agents for the production of oligomers of olefinically unsaturated monomers by free-radical polymerisation. WO-A-87/03605 on the other hand claims the use of certain cobalt III chelate complexes for such a purpose.

We have now discovered that molecular weight control in the free-radical polymerisation of olefinically unsaturated monomers may be effectively achieved with a further class of cobalt chelate complexes which have not been disclosed in the prior art for such use.

According to the present invention there is provided a process for the free-radical polymerisation of olefinically unsaturated monomer(s) (especially methacrylate monomer(s)) using a free-radical initiator, wherein said polymerisation is performed in the presence of a compound for effecting molecular weight control, said molecular weight control compound being selected from cobalt II chelates of the following formulae I, II and III:

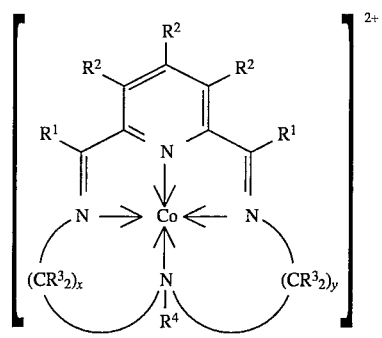

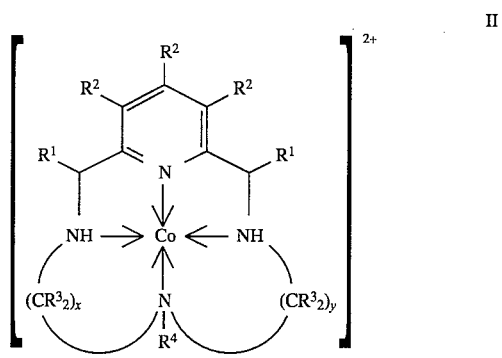

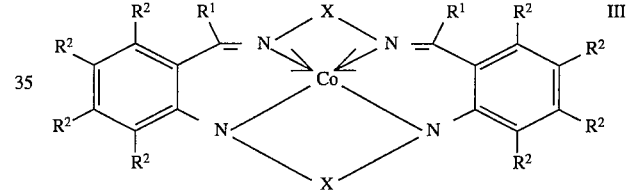

wherein:
x and y are independently 2 to 50; each $R^1$, $R^2$, $R^3$ and $R^4$ is independently selected from H, C1–C12 alkyl, optionally substituted aryl (preferably optionally substituted phenyl), $OR^5$ where $R^5$ is C1 to C12 alkyl or optionally substituted aryl (preferably optionally substituted phenyl), $CO_2R^5$, $SO_3H$, $C(=O)R^5$, $CO_2H$, $NO_2$, OH, $NR^5_2$, $NH_2$, $NHR^5$, $SR^5$, SH, CN, $SO_3R^5$, halogen (preferably Cl, Br, I or F), 2-furyl and 3-furyl;
each X is independently selected from $(CR^6_2)_n$, $(CR^6_2O)_n$, optionally substituted o-phenylene, and optionally substituted 1,8-naphthylene, where each $R^6$ is independently selected from H and C1 to C12 alkyl, and n is 1 to 10;
and wherein said cobalt chelates of formulae I and II possess a positive charge of 2 and are associated with an anion or anions for balancing the positive charge, while that of formula III is neutral;
and also Co III analogues of said cobalt II chelates of formulae I, II and III in which the Co atom is additionally covalently bonded, in a direction at right angles to the macrocyclic chelate ring system, to H, a halide ion (e.g. $Cl^-$) or other anion, or a homolytically dissociatable organic group.

It is to be understood that, as defined above, the defined cobalt chelates of formulae I and II are positively charged (of charge 2) and are associated with an appropriate anion(s) to balance the positive charge. Suitable singly charged anions include $NO_3^-$, $Cl^-$, $Br^-$, $N_3^-$, $CN^-$, $OH^-$, $C_2O_4^-$, $I^-$, $BF_4^-$, $PF_6^-$, $SbF_6^-$, $ClO_4^-$, $NCS^-$ and $R^7CO_2^-$ where $R^7$ is C1 to C8 alky and two such ions would be associated with a given cobalt chelate molecule. Br⁻ is a particularly suitable anion. Doubly charged anions such as $SO_4^{2-}$ could also e.g. be used (only one anion being required to balance the positive double charge).

Preferably:

$R^1$ is selected from H, C1–C12 alkyl and optionally substituted phenyl; $R^2$ is selected from H, C1–C12 alkyl and optionally substituted phenyl; $R^3$ is selected from H and C1 to C12 alkyl; and $R^4$ is selected from H and C1 to C12 alkyl.

More preferably:

$R^1$ is selected from H and $CH_3$; $R^2$ is H; X is selected from $(CH_2)_2$ and o-phenylene; $R^3$ is selected from H and $CH_3$; $R^4$ is selected from H and $CH_3$, and x=y=2 or 3 or x=3 and y=4.

A specific example of a Co chelate of formula III is where each $R^1$=H, each $R^2$=H and each X is $(CH_2)_2$, i.e.

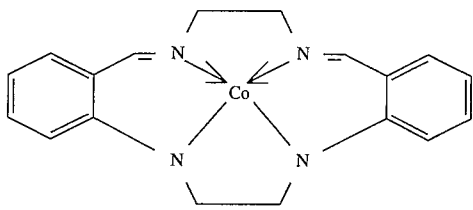

IV and another example of a Co chelate of formula III is where each $R^1$=H, each $R^2$=H and each X is o-phenylene i.e.

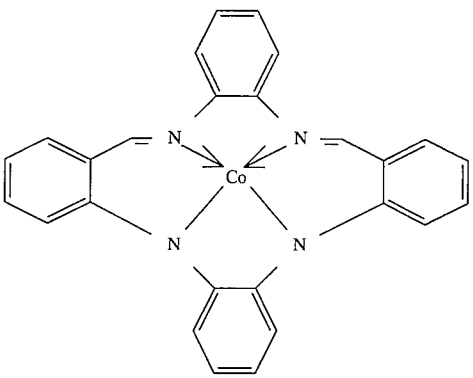

V

A further example of a cobalt chelate of formula III is where each $R^1$=H each $R^2$=H, the bottom X is $CH_2CH_2$ and the top X is o-phenylene, i.e.

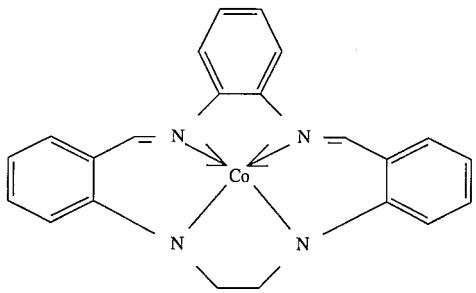

VI

A particularly preferred example is that of formula I where each $R^1$=$CH_3$; each $R^2$=H, each $R^3$=H, x=y=3, and $R^4$=H, and the charge balancing counterion is usually Br⁻, but may be, for example, an acetate, thiocyanate, nitrate or iodide ion as in

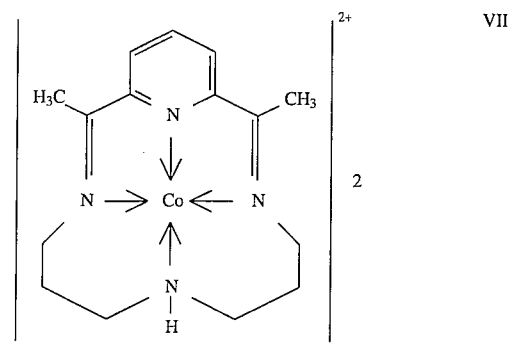

VII where Y is Br, $CH_3CO_2$, SCN, $NO_3$ or I.

This catalyst is particularly useful as it is soluble in water and aqueous media and is very effective in both emulsion and solution polymerisation (see later); also its activity appears to be enhanced in the presence of carboxylic acid-containing monomers (such as acrylic and methacrylic acid).

With respect to the various alkyl groups defined supra, they may be straight chained or branched where the option arises.

With regard to the CoIII analogues of said compounds, these arise when the Co is additionally bonded to a further atom, ion or organic group which is homolytically dissociable, such as H, optionally substituted alkyl, cyano, halide, ester, aryl (including heterocyclic aryl), and alicyclyl (including heterocyclic alicyclyl) such a further group of necessity being located in an axial position (i.e. perpendicular to the equatorial ligands as shown in the formulae I to VII). Alkyl groups bearing one or more substituents on the carbon atom bonded to the metal ion are particularly suitable; such substituents may include nitrile, ester, and optionally substituted aromatic groups. Some of these CoIII complexes may be stable materials under ordinary storage conditions, and may only react under the free-radical-generating conditions of the polymerisation process. Others, particularly where H is the further (axial) group, may be highly reactive intermediate species—and indeed it is possible that all the CoII complexes (and possibly the CoIII ones as well) exert their chain transfer effect by proceeding through the reactive CoIIIH intermediate. It is also possible that there is always a periodic interchange between the CoII and CoIII valency states in the complexes during the polymerisation. In fact the actual mechanism of involvement is complicated and not properly understood on our part and we do not wish to be bound by any particular theory nor to an identification of the specific chemical constitution or valency state of the Co complex during the actual polymerisation process.

It is also possible for the cobalt complexes as defined supra (i.e. CoII or CoIII complexes) to additionally have further ligands coordinated to the Co atom (presumably axially), which do not alter the Co valency state. These may be derived en passant from the reaction medium used in the preparation of the Co complex or from the polymerisation medium used in the polymerisation process, or may be derived by deliberately adding a compound which will provide such ligands, and it is often the case that the coordinated presence thereof in the complex will ameliorate the latter's effectiveness. However, they are not essential to the invention, and for convenience they have not been shown in the formulae I to VII. Typical of such additional ligands are weakly basic tertiary amines such as pyridine (or their substituted derivatives), trialkyl amines, dialkylamines, ethers such as tetrahydrofuran and diethyl ether, and also optionally substituted trialkyl, triaryl or tri(alkyl/aryl) phosiphines (or analogous compounds such as corresponding alkoxy or aryloxy phosphines). One or more water molecules could also be coordinated to the Co complex.

The defined cobalt chelate complexes allow the efficient production of oligomers and could be functioning as catalytic chain transfer agents. Generally speaking, the degree of polymerisation of such oligomers (overall in the case of copolymers) will usually be within the range 2 to about 1000 (i.e. 2 to 1000 polymerised units), preferably 10 to 750, and more preferably 10 to 130.

The polymerisation process can be carried out in the presence of a polymerisation medium (acting as a carrier medium for the components and as a heat transfer medium) or in the absence of such a medium (i.e. in bulk). When using a polymerisation medium, the polymerisation may be e.g. a solution, suspension or emulsion polymerisation.

Typical organic solvents which may be used as the medium for a solution polymerisation include aromatic hydrocarbons such as benzene, toluene, and the xylenes; ethers such as diethyl ether, tetrahydrofuran, alkoxylated ethylene glycol or polyethyleneglycol; alcohols such as methanol, ethanol, propanol and butanol and their esters with carboxylic acids such as acetic, propionic and butyric acids; ketones such as acetone or methyl ethyl ketone; and liquid tertiary amines such as pyridine. Mixtures of solvents may be used. Water may also be used as a polymerisation medium, (sometimes in combination with a solvent(s) such as described above) as in suspension or emulsion polymerisations, and for such processes conventional emulsifying or suspension agents may be employed. When emulsion polymerisation is used, as emulsifiers there may be used anionic surfactants such as the Na, K and ammonium salts of dialkylsulphosuccinates, Na, K and ammonium salts of sulphated oils, Na, K and $NH_4$ salts of alkyl sulphonic acids, Na, K and ammonium alkyl sulphates (such as Na, K and ammonium lauryl sulphate) and Na, K and $NH_4$ salts of fatty acids. However, cationic emulsifiers such as hexadecyltrimethyl ammonium bromide may also be used. The amount used is usually 0.2 to 15% by weight, preferably 0.2 to 5% by weight based on the total monomer(s) charged. The polymerisations are usually performed at a temperature within the range of 25° to 160° C. (more usually 45° to 110° C.). Any suitable free radical yielding initiator may be used in the process of the invention, the usual criteria being that it has acceptable solubility in one or more of the other polymerisation components (e.g. organic solvent, monomers, or water), is sufficiently active at the polymerisation temperature (usually having a half life within the range 0.5 to 5 hours), and does not unacceptably affect the stability of the Co chelate. Thus, the initiator may be selected from such free-radical-yielding initiators which may include azo compounds as 2,2'-azobis(isobutyronitrile), 2,2'-azobis-(2-methyl)butanenitrile,4,4'-azobis(4-cyanovaleric acid), 2-(t-butylazo)-2-cyanopropane, 2,2'-azobis[2-methyl-N-(1,1)-bis(hydroxymethyl)-2-hydroxyethyl]- propionamide, and 2,2'-azobis[2-methyl-N-hydroxyethyl)]-propionamide.
Other soluble free radical initiators may also be used, examples of which may include peroxy compounds such as benzoyl peroxide, lauroyl peroxide, hydrogen peroxide, and Na, K, and $NH_4$ persulphates. Redox initiator system can also be used, examples of which include redox pairs such as $NH_4$ persulphate and Na metabisulphite.

The process may be carried out using an "all-in-one" batch process in which all components are present in the reaction medium at the start of polymerisation or a semi batch process in which one or more of the components employed (usually at least one of the monomers) is wholly or partially fed to the polymerisation medium during the polymerisation. The monomer(s) can be fed neat or as emulsions in water. When more than one monomer is being added, the composition of the monomer feed in the semi-batch process may be varied during the feed operation as is well known in the art.

The chelates used in the process may be prepared beforehand or may be formed in-situ from the appropriate reactants. Typically, the level of the cobalt chelate used in the polymerisation process will be such that the ratio of monomer(s)/initiator(molar basis) is within the range of from 20 to 500, more usually 40 to 300. Also typically, the level of cobalt employed will be such that the ratio of cobalt chelate to free-radical initiator(molar basis) is within the range of 0.001 to 0.1, more usually 0.003 to 0.08.

The process of the invention is most effectively applied to the homo-or copolymerisation of methacrylate esters or styrenes, although acrylate esters can be polymerised, particularly if included as comonomers.

Examples of monomers that may be polymerised include methyl methacrylate, ethyl methacrylate, propyl methacrylate (all isomers), butyl methacrylate (all isomers), and other alkyl methacrylates; corresponding acrylates; also functionalised methacrylates and acrylates including glycidyl methacrylate, trimethoxysilyl propyl methacrylate, allyl methacrylate, hydroxyethyl methacrylate, hydroxypropyl methacrylate, dialkylaminoalkyl methacrylates; fluoroalkyl (meth) acrylates; methacrylic acid, acrylic acid; fumaric acid (and esters), itaconic acid (and esters), maleic anhydride; styrene, α-methyl styrene; vinyl halides such as vinyl chloride and vinyl fluoride; acrylonitrile, methacrylonitrile; vinylidene halides of formula $CH_2{=}C(Hal)_2$ where each halogen is independently Cl or F; optionally substituted butadienes of the formula $CH_2{=}C(R^8)\ C(R^8){=}CH_2$ where $R^8$ is independently H, C1 to C10 alkyl, Cl, or F; sulphonic acids or derivatives thereof of formula $CH_2{=}CHSO_2OM$ wherein M is Na, K, Li, $N(R^9)_4$, $R^9$, or $—(CH_2)_2—D$ where each $R^9$ is independently H or C1 or C10 alkyl, D is $CO_2Z$, OH, $N(R^9)$ or $SO_2OZ$ and Z is H, Li, Na, K or $N(R^9)_4$; acrylamide or derivatives thereof of formula $CH_2{=}CHCON(R^9)_2$, and methacrylamide or derivates thereof of formula $CH_2{=}C(CH_3)CON(R^9)_2$. Mixtures of such monomers may be used.

Preferred monomers are C1–C10 alkyl methacrylates, C1–C10 alkyl acrylates, methacrylic acid, styrene and styrene derivatives.

The present invention is now illustrated but in no way limited by reference to the following examples. Unless otherwise specified all parts, percentages and ratios are on a weight basis.

GENERAL PROCEDURES

Solution Polymerisation

To a 200 ml Schlenk tube filled with dry nitrogen and 0.085 g 2,2' azobis(isobutyronitrile) (AIBN) were added 10 ml methyl methacrylate (MMA) and 20 ml of the appropriate solvent, both of which had been previously sparged with dry nitrogen. The desired amount of cobalt catalyst was then added and the tube heated at 60° C. for 6 hours under nitrogen. Gel Permeation Chromatography (GPC) was used to determine the molecular weight of the polymer produced against polymethyl methacrylate (PMMA) calibration standards.

Emulsion Polymerisation 0.5 g sodium lauryl sulphate (SLS) were added to a reaction flask fitted with a dropping funnel and overhead stirrer, the apparatus being filled with dry nitrogen and immersed in a water bath at 75° C. 80 ml degassed distilled water and 0.5 g 4,4'-azobis (cyanovaleric acid) (CVA) were then added. The dropping funnel was charged with 0.5 g SLS, 25 ml degassed distilled water, the desired amount of cobalt catalyst and 50 ml degassed methyl methacrylate. The feed, which was continuously agitated, was then added to the charge over a period of 2 hours while stirring the reaction mixture at 170 rpm and the reaction maintained at 75° C. for a further 5 hours. A nitrogen atmosphere was maintained in the flask throughout the reaction. Gel Permeation Chromatography (GPC) was used to determine the molecular weight of the polymer latex produced against PMMA calibration standards.

In the following examples, [Monomer]/[Co] means the mole ratio of the monomer or monomers to Co catalyst. MeOH means methanol. Mn is the number average molecular weight. Mw is the weight average molecular weight.

EXAMPLES 1–3

These examples illustrate the use of 2,12-Dimethyl-3,7, 11,17,-tetraazabicyclo [11.3.1]heptadeca 1(17),2,11,13,15-pentaene cobalt (II) bromide monohydrate (Co-pydiene), the Co chelate of formula VII (not showing the water ligand), where Y is Br, as a catalytic chain transfer agent in the solution polymerisation of MMA.

The title compound was prepared from the reaction of diacetyl pyridine with 3,3' diaminodipropylamine in the presence of cobalt bromide as decribed by D. H. Busch and K. M. Long in *Inorganic Chemistry* 9(3) (1970)511. The general procedure for solution polymerisation was followed using the indicated amount of Co-pydiene and the results are shown below:

| Example | Solvent | [Monomer]/[Co] | Mn | Mw/Mn |
|---|---|---|---|---|
| 1 | MeOH | 100000 | 13160 | 2.5 |
| 2 | MeOH | 50000 | 7740 | 2.8 |
| 3 | MeOH | 10000 | 1480 | 1.8 |

A repeat of the above experiment with no catalyst gave a polymer with Mn=51800, Mw/Mn=2.5.

EXAMPLE 4

This example illustrates the use of Co-pydiene as a catalytic chain transfer agent in the emulsion polymerisation of MMA.

The general procedure for emulsion polymerisation was followed using the indicated amount of Co-pydiene as catalyst (prepared as in Example 1). The results are indicated below:

| Example | [Monomer]/[Co] | Mn | Mw/Mn |
|---|---|---|---|
| 4 | 2000 | 11100 | 1.7 |

EXAMPLE 5

This example illustrates the use of Co-pydiene as a catalytic chain transfer agent in the emulsion copolymerisation of MMA and methacrylic acid (MAA).

The general procedure for emulsion polymerisation was followed except that 48 ml degassed MMA and 5 ml degassed MAA were used instead of MMA alone, using the indicated amount of Co-pydiene prepared as in Example 1 as catalyst. The results are indicated below:

| Example | [Monomer]/[Co] | Mn | Mw/Mn |
|---|---|---|---|
| 5 | 2000 | 2630 | 1.7 |

A repeat of the above experiment with no catalyst gave a polymer with Mn>274000, Mw/Mn>1.8.

EXAMPLES 6–8

These examples illustrate the use of 1,5,8,12-tetra-aza-3, 4:9,10:13,14-tribenzocyclotetradecane-1, 11-dienato cobalt (II) (Cocyphen), the Co chelate of formula VI, as a catalytic chain transfer agent in the solution polymerisation of MMA.

The title compound was prepared from o-phenylene diamine and 4,7-diaza-2,3:8, 9-dibenzodecane-1,10-dione in refluxing methanol in the presence of cobalt acetate, as described by Tasker and Green in *Inor. Chim. Acta* (1971) 5.65.

The general procedure for solution polymerisation was followed. Results were as indicated below:

| Example | [Monomer]/[Co] | Mn | Mw/Mn |
|---|---|---|---|
| 6 | 53085 | 31600 | 2.6 |
| 7 | 26540 | 3233 | 2.2 |
| 8 | 9290 | 1000 | 1.7 |

A repeat of the above experiment with no catalyst gave a polymer with Mn=47400, Mw/Mn=2.7.

EXAMPLE 9

This example illustrates the use of Co-pydiene in the emulsion terpolymerisation of MMA, MAA and styrene (composition 40/30/30 by weight respectively).

The general procedure for emulsion polymerisation was followed, using the amount of catalyst indicated below. The results are also indicated.

| Example | [Monomer]/[Co] | Mn | Mw/Mn |
|---|---|---|---|
| 9 | 2000 | 7970 | 2.3 |

EXAMPLE 10

This example illustrates the use of 2,12-dimethyl-3,7,11, 17-tetraazabicyclo-[11.3.1]heptadeca-1,(17),2,11,13,15-Pentaene cobalt (II) thiocyanate as a catalytic chain transfer agent in the solution polymerisation of methyl methacrylate (MMA).

The title compound was prepared in an analogous manner to that for the preparation of Co-pydiene from the reaction of diacetyl pyridine with 3,3'-diamino-dipropylamine in the presence of cobalt (II) thiocyanate. The general procedure for solution polymerisation was followed using the indicated amount of the title compound and the results were as shown below (molecular weights were measured after 1 hour reaction time).

| Example | Solvent | [MMA]/[Co] | Mn | Mw/Mn |
|---|---|---|---|---|
| 10a | MeOH | 100,000 | 6,079 | 1.88 |
| 10b | MeOH | 50,000 | 3,984 | 1.56 |
| 10c | MeOH | 10,000 | 1,103 | 1.28 |

A repeat of the above experiment with no catalyst gave a polymer with Mn=60370, Mw/Mn=1.95.

EXAMPLE 11

This example illustrates the use of 2,12-dimethyl-3,7,11,17-tetraazabicyclo-[11.3.1]heptadeca-1,(17),2,11,13,15-pentaene cobalt (II) acetate as a catalytic chain transfer agent in the solution polymerisation of methyl methacrylate (MMA).

The title compound was prepared in an analogous manner to that for the preparation of Co-pydiene from the reaction of diacetyl pyridine with 3,3'-diamino-dipropylamine in the presence of cobalt (II) acetate and recrystallised from dichloromethane. The general procedure for solution polymerisation was followed using the indicated amount of the title compound and the results were as shown below (molecular weights were measured after 1 hour reaction time).

| Example | Solvent | [MMA]/[Co] | Mn | Mw/Mn |
|---|---|---|---|---|
| 11a | MeOH | 100,000 | 4,605 | 1.81 |
| 11b | MeOH | 50,000 | 4,931 | 1.71 |
| 11c | MeOH | 10,000 | 1,523 | 1.74 |

A repeat of the above experiment with no catalyst gave a polymer with Mn=30390, Mw/Mn=2.67.

EXAMPLE 12

This example illustrates the use of 2,10-dimethyl-3,6,9,15-tetraazabicyclo-[9.3.1]pentadeca-1, (15),2,9,11,13-pentaene cobalt (II) bromide as a catalytic chain transfer agent in the solution polymerisation of methyl methacrylate (MMA).

The title compound was prepared in an analogous manner to that for the preparation of Co-pydiene from the reaction of diacetyl pyridine with diethylene triamine in the presence of cobalt (II) bromide. The general procedure for solution polymerisation was followed using the indicated amount of the title compound and the results were as shown below (molecular weights were measured after 1 hour reaction time)

| Example | Solvent | [MMA]/[Co] | Mn | Mw/Mn |
|---|---|---|---|---|
| 12a | MeOH | 100,000 | 55,810 | 1.97 |
| 12B | MeOH | 50,000 | 50,940 | 2.02 |
| 12c | MeOH | 10,000 | 38,780 | 1.99 |

A repeat of the above experiment with no catalyst gave a polymer with Mn=55500, Mw/Mn=1.96.

EXAMPLE 13

This example illustrates the use of 2,11-dimethyl-3,6,10,16-tetraazabicyclo-[10.3.1]hexadeca-1,(16),2,10,12,14-pentaene cobalt (II) bromide as a catalytic chain transfer agent in the solution polymerisation of methyl methacrylate (MMA).

The title compound was prepared in an analogous manner to that for the preparation of Co-pydiene from the reaction of diacetyl pyridine with N-(2-aminoethyl)-1, 3-propanediamine in the presence of cobalt (II) bromide. The general procedure for solution polymerisation was followed using the indicated amount of the title compound and the results were as shown below (molecular weights were measured after 1 hour reaction time).

| Example | Solvent | [MMA]/[Co] | Mn | Mw/Mn |
|---|---|---|---|---|
| 13a | MeOH | 100,000 | 46,580 | 1.96 |
| 13b | MeOH | 50,000 | 22,710 | 2.09 |
| 13c | MeOH | 10,000 | 8,150 | 2.35 |

EXAMPLE 14

This example illustrates the use of 2,13-dimethyl-3,7,12,18-tetraazabicyclo-[12.3.1]octadeca-1,(18),2,8,12,14,16-pentaene cobalt (II) bromide as a catalytic chain transfer agent in the solution polymerisation of methyl methacrylate (MMA).

The title compound was prepared in an analogous manner to that for the preparation of Co-pydiene from the reaction of diacetyl pyridine with spermidine (3-aminopropyl-3'-aminobutylamine) in the presence of cobalt (II) bromide. The general procedure for solution polymerisation was followed using the indicated amount of the title compound and the results were as shown below (molecular weights were measured after 1 hour reaction time).

| Example | Solvent | [MMA]/[Co] | Mn | Mw/Mn |
|---|---|---|---|---|
| 14a | MeOH | 100,000 | 18,620 | 2.40 |
| 14b | MeOH | 50,000 | 11,700 | 2.26 |
| 14c | MeOH | 10,000 | 8,306 | 2.05 |

A repeat of the above experiment with no catalyst gave a polymer with Mn=55500, Mw/Mn=1.96.

EXAMPLE 15

This example illustrates the use of 2,7,12-trimethyl-3,7,11,17-tetraazabicyclo-[11.3.1]heptadeca-1,(17),2,11,13,15-pentaene cobalt (II) bromide as a catalytic chain transfer agent in the solution polymerisation of methyl methacrylate (MMA).

The title compound was prepared in an analogous manner to that for the preparation of Co-pydiene from the reaction of diacetyl pyridine with 3,3'-diamino-N-methyl-dipropylamine in the presence of cobalt (II) bromide. The general procedure for solution polymerisation was followed using the indicated amount of the title compound and the results were as shown below (molecular weights were measured after 1 hour reaction time).

| Example | Solvent | [MMA]/[Co] | Mn | Mw/Mn |
|---|---|---|---|---|
| 15a | MeOH | 100,000 | 16,080 | 3.54 |
| 15b | MeOH | 50,000 | 14,980 | 3.11 |
| 15c | MeOH | 10,000 | 7,373 | 2.56 |

A repeat of the above experiment with no catalyst gave a polymer with Mn=43780, Mw/Mn=2.11.

EXAMPLE 16

This example illustrates the use of Co-pydiene as a catalytic chain transfer agent in the emulsion polymerisation of methyl methacrylate (50 wt %), methacrylic acid (30 wt %) and styrene (20 wt %).

The polymerisation apparatus consisted of a 2 litre baffled flanged flask fitted with a stirrer and condenser. The apparatus was evacuated and flushed with nitrogen before use. The polymerisation temperature was monitorable using a thermocouple and digital read out. The reaction was heated using a thermostatically controlled water bath.

All monomers and water were degassed (deoxygenated) by passing a stream of nitrogen through them for at least one hour before use.

De-oxygenated, de-ionised water (758 ml) and sodium lauryl sulphate (8.4 g) were charged to the reaction flask which was heated to 75° C. and stirred.

An aqueous solution of the cobalt catalyst was prepared. Co-pydiene (1.0592 g) was taken and added to a round bottomed flask. The flask was evacuated and flushed with nitrogen three times. De-oxygenated, de-ionised water (100 g) was added via a syringe to the flask.

The monomer mixture was prepared in a round bottomed flask. The flask was evacuated and flushed with nitrogen three times. Styrene (88 ml), methacrylic acid (118.3 ml) and methyl methacrylate (213.7 ml) were taken by syringe and added to the flask.

Cyanovaleric acid (5.1 g) and water (50 ml) were added to the reaction flask. The monomer mixture and aqueous solution of Co-pydiene were fed using syringes attached to syringe pumps at a linear rate over a period of 120 minutes. The temperature in the reaction flask was maintained at (75±2)° C. during the feed time and for a further 3 hours before cooling to ambient temperature.

The molecular weight of the resulting latex was determined by GPC and gave Mn 3053 and PDi 2.66.

What is claimed is:

1. Process for the free-radical polymerisation of olefinically unsaturated monomer(s) using a free-radical initiator, wherein said polymerisation is performed in the presence of a compound for effecting molecular weight control, said molecular weight control compound being selected from Cobalt II chelates of the following formulae I, II and III:

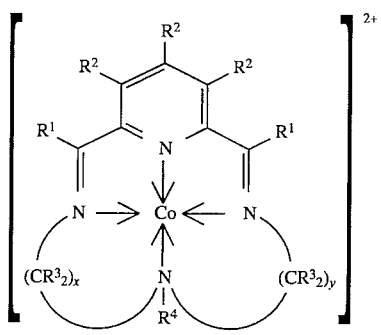

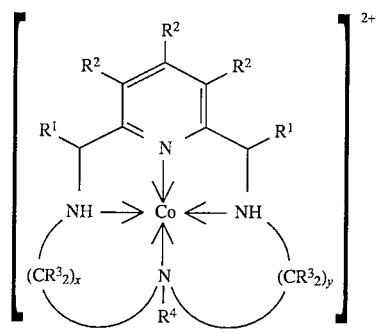

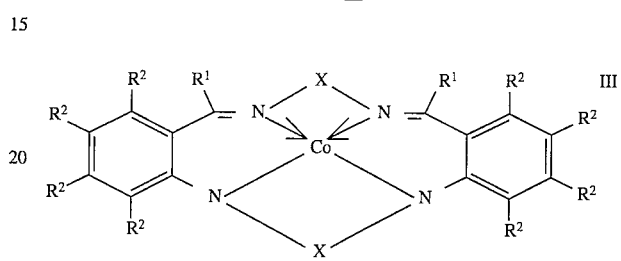

wherein:

x and y are independently 2 to 5;

each $R^1$, $R^2$, $R^3$ and $R^4$ is independently selected from H, C1–C12 alkyl, optionally substituted aryl, $OR^5$ where $R^5$ is C1 to C12 alkyl or optionally substituted aryl, $CO_2R^5$, $SO_3H$, $C(=O)R^5$, $CO_2H$, $NO_2$, OH, $NR^5{}_2$, $NH_2$, $NHR^5$, $SR^5$, SH, CN, $SO_3R^5$, halogen, 2-furyl and 3-furyl;

each X is independently selected from $(CR^6{}_2)_n$, $(CR^6{}_2O)_n$, optionally substituted o-phenylene, and optionally substituted 1,8-naphthylene, where each $R^6$ is independently selected from H and C1 to C12 alkyl, and n is 1 to 10;

and wherein said cobalt chelates of formulae I and II possess a positive charge of 2 and are associated with an anion or anions for balancing the positive charge, while that of formula III is neutral;

and also Co III analogues of said cobalt II chelates of formulae I, II and III in which the Co atom is additionally covalently bonded, in a direction at right angles to the macrocyclic chelate ring system, to H, a halide ion or other anion, or a homolytically dissociatable organic group.

2. Process according to claim 1 wherein the anion associated with said cobalt chelates of formula I or formula II is selected from $NO_3{}^-$, $Cl^-$, $Br^-$, $N_3{}^-$, $CN^-$, $OH^-$, $C_2O_4{}^-$, $I^-$, $BF_4{}^-$, $PF_6{}^-$, $SbF_6{}^-$, $ClO_4{}^-$, $NCS^-$, $R^7CO_2{}^-$ where $R^7$ is C1 C8 alkyl, and $SO_4{}^{2-}$.

3. Process according to either claim 1 or claim 2 wherein each $R^1$ is independently selected from H, C1–C12 alkyl and optionally substituted phenyl; each $R^2$ is independently selected from H, C1–C12 alkyl and optionally substituted phenyl; each $R^3$ is independently selected from H and C1–C12 alkyl; and $R^4$ is selected from H and C1 to C12 alkyl.

4. Process according to any one of the preceding claims wherein each $R^1$ is independently selected from H and $CH_3$; $R^2$ is H; each X is independently selected from $(CH_2)_2$ and o-phenylene, each $R^3$ is independently selected from H and $CH_3$; $R^4$ is selected from H and $CH_3$, and x=y=2 or 3.

5. Process according to claim 4 wherein there is used a cobalt chelate complex of formula I, and in which further each $R^1$ is $CH_3$, each $R^2$ is H, each $R^3$ is H, x=y=3, and $R^4$ is H.

6. Process according to claim 5 wherein the charge balancing anion is Br⁻, this cobalt chelate having the formula

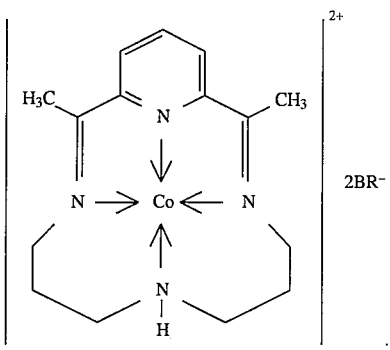

7. Process according to claim 4 wherein there is used a cobalt chelate complex of formula III, and in which further each $R^1$ is H, each $R^2$ is H, the bottom X is $CH_2CH_2$ and the top X is o-phenylene, this cobalt chelate having the formula

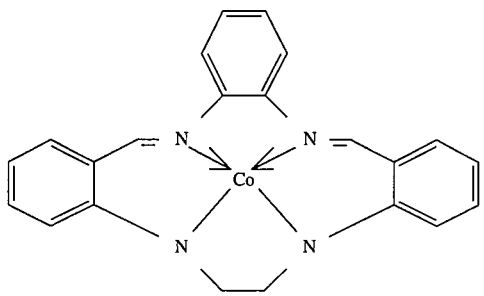

8. Process according to any one of the preceding claims wherein said cobalt chelate has a further ligand(s) coordinated to the cobalt atom which does not alter the cobalt valency state, said ligand being selected from weakly basic tertiary amines, ethers, optionally substituted trialkyl, triaryl, or tri(alkyl/aryl)phosphines and the corresponding alkoxy or aryloxy phosphines, and water.

9. Process according to any one of the preceding claims wherein said polymerisation is a bulk or solution polymerisation.

10. Process according to any one of claims 1 to 8 wherein said polymerisation is an aqueous suspension or aqueous emulsion polymerisation.

11. Process according to any one of the preceding claims wherein said process is applied to the homo- or copolymerisation of methacrylate esters or styrenes.

12. Process according to any one of claims 1 to 10 wherein said monomer(s) polymerised is selected from at least one or more of C1 to C10 alkyl methacrylates, C1 to C10 alkyl acrylates, methacrylic acid, styrene and styrene derivatives.

13. Process according to any one of claims 1 to 10 wherein the monomer polymerised is selected from at least methyl methacrylate, ethyl methacrylate, propyl methacrylate (all isomers), butyl methacrylate (all isomers); the corresponding acrylates; functionalised methacrylates and acrylates selected from glycidyl methacrylate, trimethoxysilyl propyl methacrylate, allyl methacrylate, hydroxyethyl methacrylate, hydroxypropyl methacrylate, and dialkylaminoalkyl methacrylates; fluoroalkyl (meth) acrylates; methacrylic acid, acrylic acid; fumaric acid (and esters), itaconic acid (and esters), and maleic anhydride; styrene, α-methyl styrene; vinyl chloride and vinyl fluoride; acrylonitrile, methacrylonitrile; vinylidene halides of formula $CH_2=C(Hal)_2$ where each halogen is independently Cl or F; optionally substituted butadienes of the formula $CH_2=C(R^8) C(R^8)=CH_2$ where $R^8$ is independently H, C1 to C10 alkyl, Cl, or F; sulphonic acids or derivatives thereof of formula $CH_2=CHSO_2OM$ wherein M is Na, K, Li, $N(R^9)_4$, $R^9$, or $—(CH_2)_2—D$ where each $R^9$ is independently H or C1 to C10 alkyl, D is $CO_2Z$, OH, $N(R^9)_2$ or $SO_2OZ$ and Z is H, Li, Na, K or $N(R^9)_4$; acrylamide or derivatives thereof of formula $CH_2=CHCON(R^9)_2$, and methacrylamide or derivates thereof of formula $CH_2=C(CH_3)CON(R^9)_2$, and mixtures of such monomers.

14. Process according to any of the preceding claims wherein there is used a free radical yielding initiator selected from 2,2'-azobis(isobutyronitrile), 2,2'-azobis-(2-methyl) butanenitrile, 4,4'-azobis(4-cyanovaleric acid), 2-(t-butylazo)-2-cyanopropane, 2,2'-azobis[2-methyl-N-(1,1)-bis(hydroxymethyl)-2-hydroxyethyl]propionamide and 2,2'-azobis [2-methyl-N-hydroxyethyl)]-propionamide.

* * * * *